United States Patent
Krefta et al.

(10) Patent No.: US 6,741,060 B2
(45) Date of Patent: May 25, 2004

(54) METHOD AND SYSTEM FOR CONTROLLING A PERMANENT MAGNET MACHINE DURING FAULT CONDITIONS

(75) Inventors: Ronald John Krefta, Noblesville, IN (US); James E. Walters, Carmel, IN (US); Fani S. Gunawan, Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 250 days.

(21) Appl. No.: 09/827,052

(22) Filed: Apr. 5, 2001

(65) Prior Publication Data

US 2002/0145837 A1 Oct. 10, 2002

(51) Int. Cl.$^7$ ............................................... H02P 1/24
(52) U.S. Cl. ......................................................... 318/727
(58) Field of Search ................................. 318/432, 530, 318/537, 719, 139, 805, 807, 254, 727

(56) References Cited

U.S. PATENT DOCUMENTS

| | | | |
|---|---|---|---|
| 5,504,404 A | 4/1996 | Tamaki et al. | 318/432 |
| 5,796,224 A | 8/1998 | Hayashi et al. | 318/139 |
| 5,801,498 A | 9/1998 | Kusano et al. | 318/139 |
| 6,008,602 A | 12/1999 | Karwath | 318/254 |
| 6,239,566 B1 * | 5/2001 | Tareilus et al. | 318/379 |
| 6,407,531 B1 * | 6/2002 | Walters et al. | 318/805 |
| 6,429,620 B2 * | 8/2002 | Nakazawa | 318/701 |

* cited by examiner

*Primary Examiner*—Karen Masih
(74) *Attorney, Agent, or Firm*—Jimmy L. Funke

(57) ABSTRACT

Method and system for controlling a permanent magnet machine driven by an inverter is provided. The method allows for monitoring a signal indicative of a fault condition. The method further allows for generating during the fault condition a respective signal configured to maintain a field weakening current even though electrical power from an energy source is absent during said fault condition. The level of the maintained field-weakening current enables the machine to operate in a safe mode so that the inverter is protected from excess voltage.

18 Claims, 3 Drawing Sheets

METHOD AND SYSTEM FOR CONTROLLING A PERMANENT MAGNET MACHINE DURING FAULT CONDITIONS

This invention was made with U.S. Government support through Definitized Subcontract C-HEV-5A under MRI/CHRYSLER LETTER SUBCONTRACT NO. ZAN-6-16334-01, which subcontract was in turn issued under MRI/CHRYSLER PRIME CONTRACT NO. DE-AC36-83CH10093" awarded by the Department of Energy, and, in accordance with the terms set forth in said contracts, the U.S. Government may have certain rights in the invention.

BACKGROUND OF THE INVENTION

The present invention is generally related to control of electromechanical machines, and, more particularly, the present invention is related to method and system for controlling a permanent magnet (PM) machine during fault conditions.

In the control of inverter-driven PM machines used in propulsion systems, field weakening is often used to lower the inverter current and/or voltage rating for a given application. That is, without field weakening the inverter manufacturer would have to use components rated to handle higher levels of current and/or voltage for that given application. This would undesirably add incremental costs to the propulsion system. Field weakening is generally accomplished by configuring the machine windings to provide a greater torque per amp ratio, and thus achieve a lower base speed for a given torque load. During high speed operation, the phase current may be applied to the machine windings in advance of the phase electromotive force (EMF), and thus the EMF, while greater in peak magnitude than the energy source voltage, would have an apparent magnitude lower that the source voltage.

Above the base speed of the machine, where the line-to-line EMF voltage due to the magnets has become greater or equal to the source voltage, a field-weakening current needs to be applied to the machine in order for torque to be realized. The flux created by this current is in opposition to the magnet's flux, and this reduces the effective EMF seen by the inverter. It should be stressed that this current should be carefully regulated to a target value set by the commanded torque and rotor speed. Failure to control the current to an appropriate value will likely result in the undesirable scenario that excessive voltage is applied to the inverter.

The foregoing technique works well, except when the energy source, e.g., a battery, is intentionally or unintentionally disconnected and the machine is operating in the field-weakening mode. Under this condition, if corrective action is not taken, damage to the inverter could occur due to excessive voltage across the inverter and the DC bus. This excessive voltage is due to a charging mode overcharging the bus capacitance or a motoring mode depleting the bus capacitance to the point where the current can no longer be regulated. In either case, the EMF of the machine would be impressed on the inverter. If this voltage were to exceed the voltage ratings of the power semiconductor devices, or capacitors or other circuitry used by the system, costly damage to the system may occur.

Thus, in view of the foregoing considerations, it would be desirable to provide a method and system for maintaining an appropriate level of field-weakening current and for controlling the DC bus voltage even in the absence of the energy source, and hence avoid exposing the system to potentially damaging high voltages.

BRIEF SUMMARY OF THE INVENTION

Generally speaking, the present invention fulfills the foregoing needs by providing in one exemplary embodiment thereof a method for controlling a permanent magnet machine driven by an inverter. The method allows for monitoring a signal indicative of a fault condition. The method further allows for generating during the fault condition a respective signal configured to maintain an appropriate field-weakening current that enables machine control and keeps circuitry in the motor-inverter system in a safe condition even though electrical power from an energy source is absent during said fault condition.

In another aspect of the present invention, a control system for controlling a permanent magnet machine driven by an inverter is provided. The system includes a monitor coupled to receive a signal indicative of a fault condition. The system further includes a processor coupled to supply during the fault condition a respective signal configured to maintain an appropriate field-weakening current during said fault condition.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Exemplary Nomenclature $i_{qs}^e$ ($i_{ds}^e$): q-axis (d-axis) component of stator current in synchronous reference frame.

$i_{\alpha s}^s$ ($i_{\beta s}^s$): α-axis (β-axis) component of stator current in stationary reference frame.

$i_{as}^s$ ($i_{bs}^s$, $i_{cs}^s$): a-axis (b-axis, c-axis) component of stator current in stationary reference frame.

$v_{qs}^e$ ($v_{ds}^e$): q-axis (d-axis) component of stator voltage in synchronous reference frame.

$v_{\alpha s}^s$ ($v_\beta^s$): α-axis (β-axis) component of stator voltage in stationary reference frame.

$v_{as}^s$ ($v_{bs}^s$, $v_{cs}^s$): a-axis (b-axis, c-axis) component of stator voltage in stationary reference frame.

$V_{dc}$: DC bus voltage.

$V_{index}$: Magnitude of the applied machine voltage $V_{limit}$: Limit of the allowed voltage applied to the machine $V_{margin}$: A safety-margin value.

$V_{s\ max}$: Maximum output voltage inverter can provide in Space Vector Modulation.

$R_s$: Stator resistance.

$L_{ds}$: Stator D axis Inductance $L_{qs}$: Stator Q axis Inductance $\lambda_{qs}^e$ ($\lambda_{ds}^e$): q-axis (d-axis) stator flux vector in synchronous reference frame.

$\lambda_{qr}^e$ ($\lambda_{dr}^e$): q-axis (d-axis) rotor flux vector in synchronous reference frame.

$\omega_e$ ($\omega_r$): Excitation (rotor) electrical angular frequency.

$\theta_e(\theta_r)$: Excitation (rotor) electrical angle $T_e^*$: Torque reference of electric machine.

P: Number of poles.

Variable*: Variable reference.

$V_s^*$: Voltage vector reference.

Figure 1:
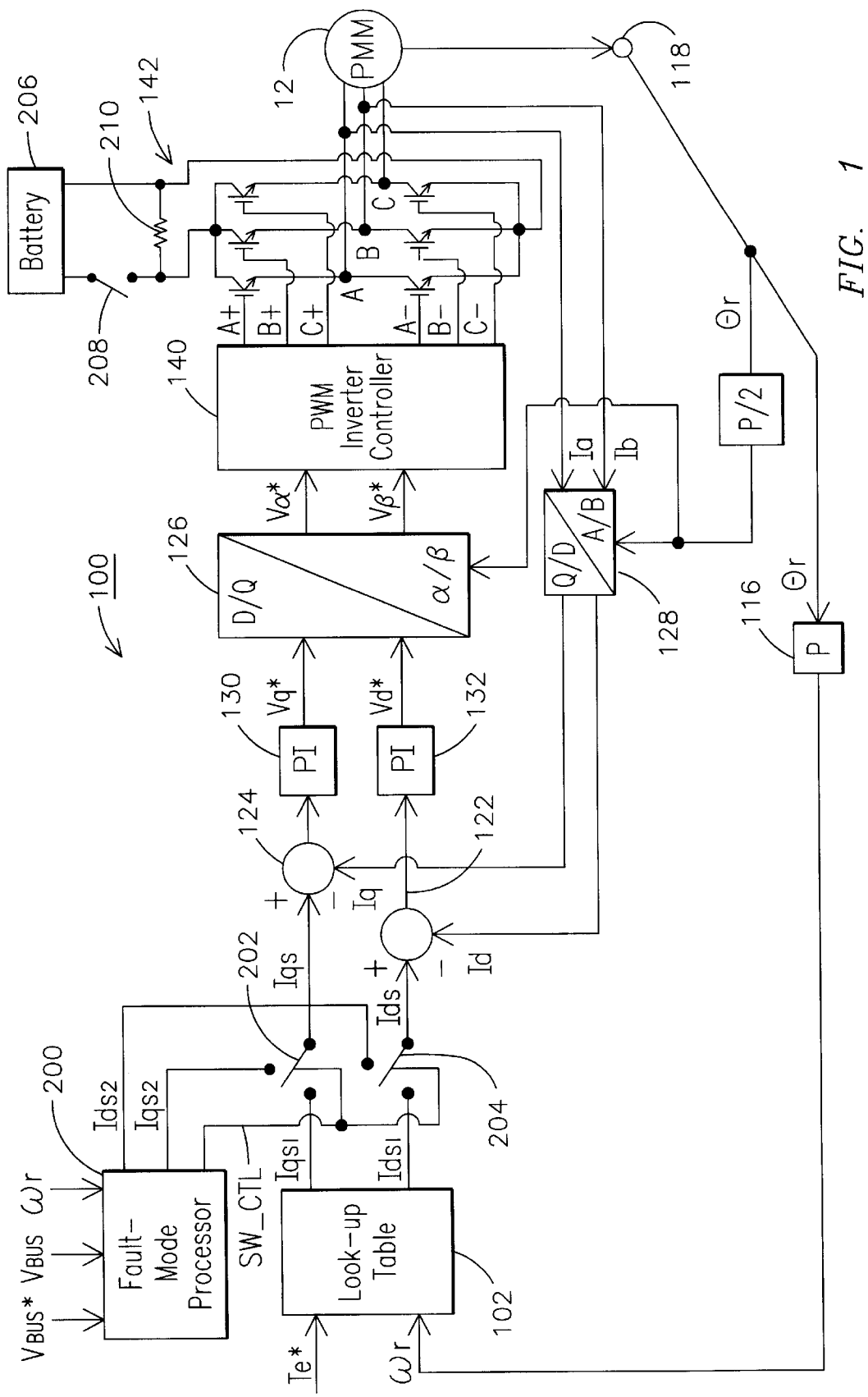
FIG. 1 illustrates a block diagram schematic of an exemplary propulsion system including a fault-mode processor in accordance with one aspect of the present invention.

FIG. 1 illustrates an exemplary propulsion system 100 configured to implement a rotor flux oriented (RFO) vector control technique using a PWM inverter controller 140. RFO vector control enables a permanent magnet machine 12 to be controlled in a similar way to a separately excited DC machine since the respective torque and flux current components can be independently controlled. As shown in FIG. 1, during a normal mode of operation, the direct (d) axis current reference ($I_{ds1}$) and the quadrature (q) axis current reference ($I_{qs1}$) may be adjusted as a function of commanded torque $T_e^*$ and rotor speed $\omega_r$ using analytically and/or experimentally derived flux-adjusting values stored in a look-up table 102 that may comprise a two-dimensional look-up table responsive to two respective inputs to supply two outputs. Look-up table 102 may be configured to provide optimum efficiency control for an ideal case by adjusting the value of the d axis current reference ($I_{ds}$) and the q axis current reference ($I_{qs}$) as a function of commanded torque $T_e^*$ and rotor speed $\omega_r$. The value of the torque reference signal $T_e^*$ may be externally-derived by a system master controller or may correspond to the torque value commanded by an operator through a suitable machine propulsion throttle handle. The value of the rotor speed signal $\omega_r$ may be derived from a rotor angle value ($\theta_r$), upon execution of a mathematical differentiation operation by a differentiator 116 which receives a signal θr indicative of rotor shaft angle, such as may be generated by a shaft encoder 118.

As will be described in greater detail below, upon sensing a fault mode of operation, a fault-mode processor 200 generates a switch control signal (sw_ctl) respectively applied to a switching device made up of a pair of switches 202 and 204 so that the values of the respective current components for the orthogonal d and q axis, e.g., $I_{ds2}$ and $I_{qs2}$ are computed or supplied by processor 200 in lieu of look-up table 102. The fault condition may arise when an energy source, e.g., battery 206, is disconnected. Some possible causes for the fault condition may include an open battery pack, an open fuse, an open connector, etc. It will be appreciated that in some conditions, the disconnection of battery 206 could occur when a contactor 208 is commanded into an open condition, such as may occur during a battery protection fault mode condition. It will be appreciated that the switch control signal may be derived based on various fault sensing conditions. In one exemplary embodiment, the switch control signal could be based on the contactor control signal, i.e., the values of the respective current components for the d and q axes would be provided by look-up table 102 when the contactor control signal indicates a closed contactor state. Conversely, the values of the respective current components for the d and q axes would be provided by processor 200 when the contactor control signal indicates an open contactor state. In another exemplary embodiment, the switch control signal could be derived by monitoring the voltage level of the DC bus, e.g., across a shunt impedance 210, and determining whether the monitored voltage is within a desired voltage range. For example, the values of the respective current components for the d and q axes would be provided by look-up table 102 when the monitored DC bus voltage is within the desired voltage range. Conversely, the values of the respective current components for the d and q axes would be provided by processor 200 when the monitored DC bus voltage is outside the desired voltage range.

Regardless of the source, the d axis current reference, ($I_{ds}$) and a feedback current signal Id is each respectively applied to a subtractor 122 to generate a difference output signal. It will be understood that the subtracting operation respectively executed by subtractor 122 and other such devices described below may be executed by a summer having one inverting input terminal and one non-inverting input terminal. It will be further understood that any of the various arithmetic and logical operations performed in system 100 may be conducted through respective software modules as may be executed in a suitable microprocessor and such operations need not be executed through hardware modules. It will be appreciated that the difference output signal from subtractor 122 represents an error signal between the d axis current reference signal (Ids) and the feedback current signal Id. Similarly, the torque-producing current component reference Iqs is processed by a subtractor 124 that receives a feedback current Iq. In this case, the difference output signal from subtractor 124 represents an error signal between the torque current component reference signal Iqs and the feedback current signal Iq.

By way of example and not of limitation, a standard RFO vector controller may comprise components such as respective voltage and current transformation units 126 and 128, and two proportional plus integral (PI) current regulators 130 and 132, each such component using techniques well-understood by those skilled in the art. For readers who desire further background regarding vector control techniques, reference is made to Chapters 5 and 6 of a textbook by D. W. Novotny and T. A. Lipo, titled "Vector Control and Dynamics of AC Drives", published by Oxford University Press, 1996, which textbook is herein incorporated by reference. Current transformation unit 128 converts the three-phase currents in the stationary frame into equivalent two-phase orthogonal currents in the rotor frame. After the transformation is performed, the two orthogonal current signals $I_q$ and $I_d$ in the rotor frame are respectively applied to the two PI current regulators 130 and 132 as current feedback signals through subtractors 124 and 122. The output signals from the PI current regulators are then provided to voltage transformation unit 126 and are converted into equivalent two-phase voltage references in the stationary frame. Each respective output signal of voltage transformation unit 126 is then applied to a PWM inverter controller 140 that in one exemplary embodiment may comprise an over-modulation space vector PWM unit to generate three respective duty cycle values. It will be appreciated that the controller functionality is analogous to having six synchronous timers for respectively generating six-gate pulse signals to the respective gate drive circuits of an inverter 142 that energizes the phases of the permanent magnet machine 12. It will be further appreciated that the inverter's legs will be appropriately switched on and off according to the voltage levels of the gate signals from the controller in order to control operation of the permanent magnet machine.

As will be readily appreciated by those of ordinary skill in the art, the mathematical equations that describe the behavior of a Permanent Magnet machine in a RFO (Rotor Flux Oriented) reference frame are given by:

$$v_{qs}^e = r_s \cdot i_{qs}^e + p\lambda_{qs}^e + \omega_e \cdot \lambda_{ds}^e$$
$$v_{ds}^e = r_s \cdot i_{ds}^e + p\lambda_{ds}^e - \omega_e \cdot \lambda_{qs}^e \quad (1)$$

where:

$$\lambda_{qs}^e = L_{qs} i_{qs}^e$$
$$\lambda_{ds}^e = \lambda_{magnet} + L_{ds} i_{ds}^e$$

In order to ensure stable operation in the field-weakened range, the following constraint should be considered:

$$\sqrt{(v_{qs}^e)^2 + (v_{ds}^e)^2} \leq V_{s\,max} - V_{m\,arg\,in} \quad (2)$$

where greater efficiency is achieved by operating with the voltage as close as possible to the limit indicated by equation 2.

In the field-weakened condition the predominant voltage drop is caused by the EMF terms. Once a fault condition is sensed, it has been demonstrated by the inventors of the present invention that if one were to appropriately adjust the values of the current components for the d and q axis, one can conceptually operate the machine as a generator, i.e., generating only sufficient power to supply the machine with field-weakening current. In this mode of operation, the electric machine would provide enough power to overcome the resistive power loss of the machine and the switching losses of the inverter. Since only the power loss of the machine and inverter is being supplied, the DC capacitor's voltage level would not change. The capacitor voltage should be maintained for the machine controller to regulate the field-weakening current to protect the inverter. In addition, if the voltage level is maintained generally constant then the field-weakening current can be chosen as a function of speed.

It will be appreciated that the machine could be operated for a short period of time as a motor but at the expense of lowering the capacitor voltage and increasing the required field-weakening current in order for the inverter to maintain current regulation capability and to protect the power electronics. This mode of operation can be useful if the DC bus level is desired to be lowered to a safer level as may be required in a diagnostic or service mode.

Figure 2:
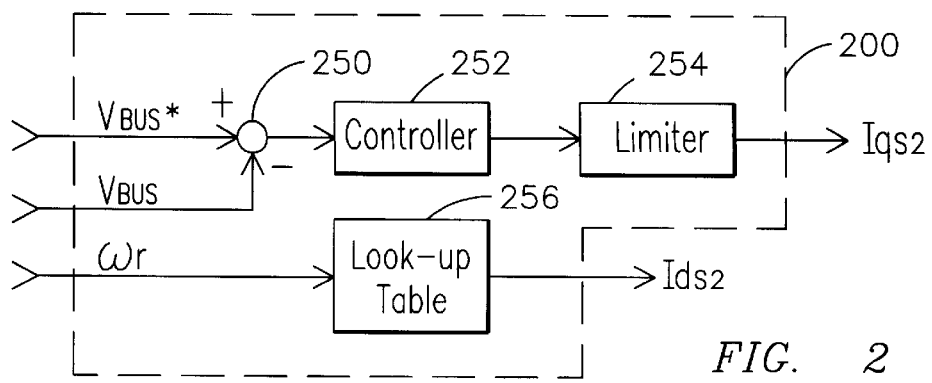
FIG. 2 shows a block diagram that illustrates further details regarding the fault-mode processor of FIG. 1.
Figure 3:
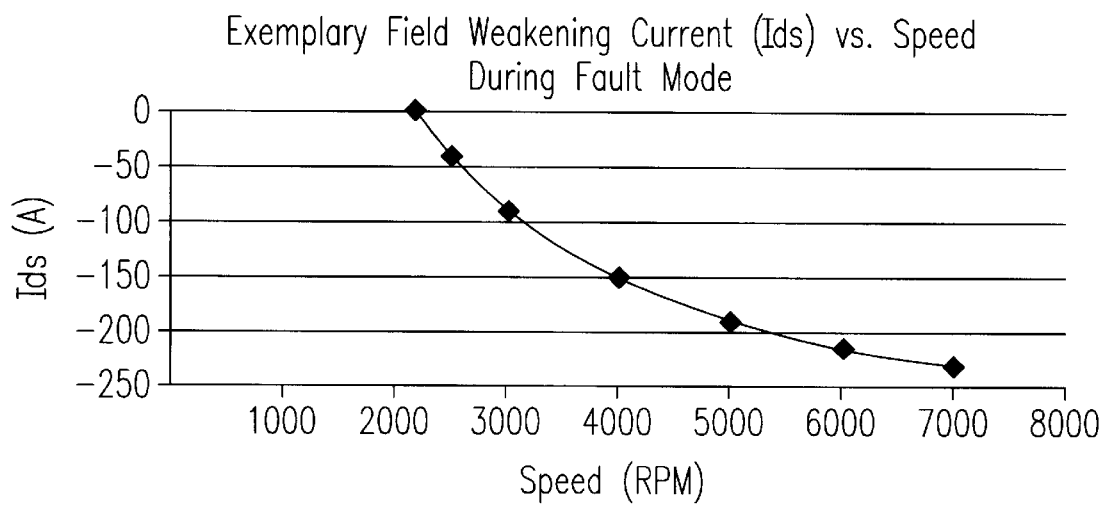
FIG. 3 shows an exemplary plot of field weakening current, (Ids) as a function of rotor speed as may be provided during a fault condition.

FIG. 2 illustrates an exemplary embodiment of fault-mode processor 200 configured to generate the values of the current components for the d and q axis during the fault condition. As shown in FIG. 2, a subtractor 250 is coupled to receive a reference bus voltage value $V_{bus}^*$ and the monitored bus voltage value $V_{bus}$ to generate a difference output signal. A current controller 252, such as PI current controller, receives the difference output signal to supply an output signal supplied to a clamping or limiting device 254 so that any positive values of the torque-producing current component $I_{qs2}$ are set to a negligible value, e.g., zero or other small value, and negative values of current component $I_{qs2}$ would be allowed to pass through, if not overly large. A look-up table 256 receives the rotor speed signal $\omega_r$ to generate the value of the flux-producing current $I_{ds2}$ during the fault mode. An exemplary plot of $I_{ds2}$ values as a function of rotor speed, as may be stored in look-up table 256, is illustrated in FIG. 3.

Figure 4:
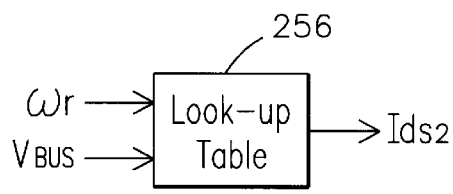
FIG. 4 illustrates an exemplary two-dimensional look-up table for generating the field weakening current, (Ids) during the fault condition.

FIG. 4 shows an embodiment wherein look-up table 256 comprises a two-dimensional look-up table responsive to the rotor speed signal $\omega_r$ and the reference bus voltage value $V_{bus}^*$ to generate $I_{ds2}$ values. It will be appreciated that the two-dimensional look-up table allows for accommodating distinct levels of bus voltages. These distinct level may be used due to a variety of considerations, such as diagnostics, safety, or efficiency reasons. In the context of this variation, the limiter (254) shown in FIG. 2 would require a finite positive limit so that positive q-axis current could be commanded. The higher the positive limit on block (254) the quicker the bus voltage could be reduced. Although a two-dimensional look-up table is shown in FIG. 4, it will be appreciated that a processor configured to provide a numerical solution to the pair of simultaneous equations 1 and 2 could be used in lieu of the look-up table.

Figure 5:
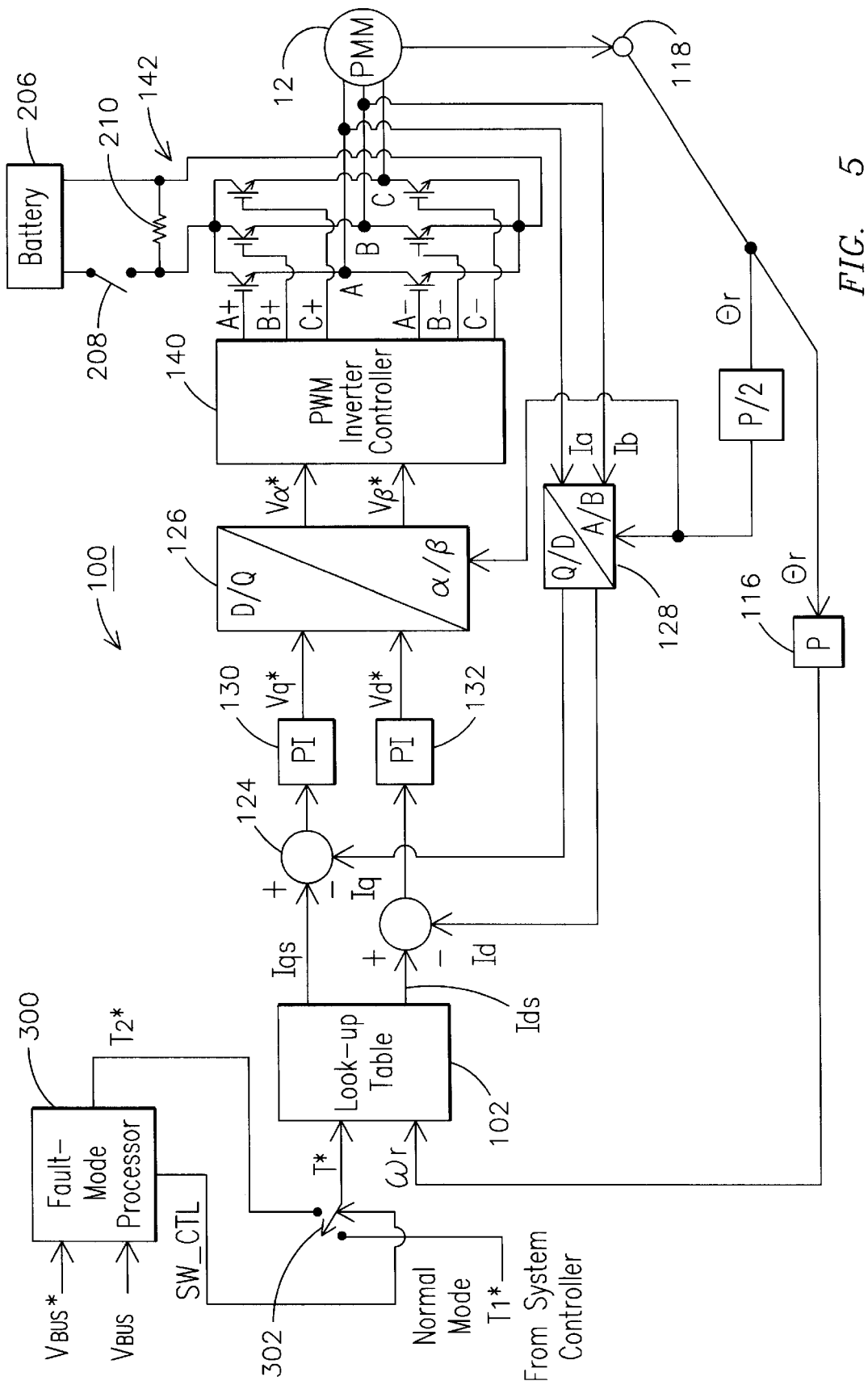
FIG. 5 shows a block diagram of a fault-mode processor in accordance with another aspect of the invention.

FIG. 5 illustrates an exemplary embodiment wherein a fault-mode processor 300 is configured to generate a torque signal to be used during the fault mode. In this embodiment, a switch 302 is responsive to a switch control signal so that during normal operation the torque signal passed through switch 302 corresponds to the standard torque reference signal supplied by the system controller. Conversely, during a fault mode of operation, switch 302 is responsive to the switch control signal to pass the torque signal computed by processor 300. In either mode, the torque signal and the rotor speed signal $\omega_r$ are supplied to look-up table 102 as discussed in the context of FIG. 1 to generate the value of the d axis current reference ($I_{ds}$) and the q axis current reference ($I_{qs}$) as a function of the commanded torque signal and rotor speed $\omega_r$. The respective $I_{ds}$ and $I_{qs}$ current components would be then be processed as shown in FIG. 1.

Figure 6:
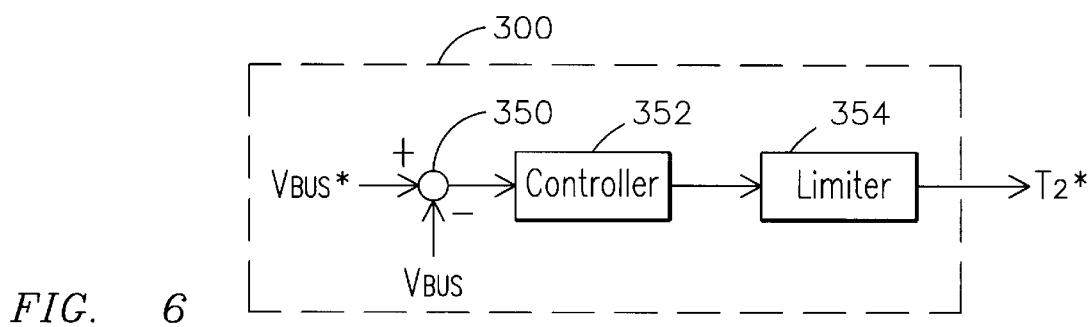
FIG. 6 shows a block diagram that illustrates further details regarding the fault-mode processor of FIG. 5.

FIG. 6 illustrates an exemplary embodiment of fault-mode processor 300 configured to generate the values of the torque command signal during the fault condition. As shown in FIG. 6, a subtractor 350 is coupled to receive a reference bus voltage value $V_{bus}^*$ and the monitored bus voltage value $V_{bus}$ to generate a difference output signal. A voltage controller 352, such as PI controller, receives the difference output signal to supply an output signal to a clamping or limiting device 354 so that any positive values of the torque command signal are set to a small or zero value while negative values would be allow to pass through, if not overly large.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for controlling an inverter-driven permanent magnet machine, the method comprising:

monitoring a signal indicative of a fault condition; and generating during the fault condition a respective signal configured to maintain a field-weakening current that allows control of the machine and inverter circuitry protection even though electrical power from an energy source is absent during said fault condition, wherein said generated signal comprises two mutually orthogonal current components, and further wherein one of said current components comprises a torque-producing current component, the level of said torque-producing component during said fault condition being limited to values not exceeding a positive limit.

2. The control method of claim 1 wherein positive values of said torque-producing current component are used to set a direct current bus coupled to the inverter to a commanded level.

3. The control method of claim 1 wherein another of said current components comprises a flux-producing current component and wherein the value of said flux-producing component during said fault condition is based on rotor speed of the machine.

4. The control method of claim 3 wherein the value of said flux-producing component during said fault condition is further based on the voltage level of a direct current bus coupled to the inverter.

5. The control method of claim 1 further comprising generating a switching control signal in response to the monitored signal to switch between respective distinct sources of the current components, one of said sources used during a normal condition and another of said sources used during the fault condition.

6. The control method of claim 1 wherein said generated signal comprises a torque command signal and wherein the value of said torque command signal during said fault condition being limited to values not exceeding a positive limit.

7. The control method of claim 5 further comprising generating a switching control signal in response to the monitored signal to switch between distinct sources of the torque command signal, one of said sources used during a normal condition and another of said sources used during the fault condition.

8. A control system for controlling an inverter-driven permanent magnet machine, the system comprising:

a monitor coupled to receive a signal indicative of a fault condition; and a processor coupled to supply during the fault condition a respective signal configured to maintain a field weakening current during said fault condition wherein the signal from said processor comprises two mutually orthogonal current components, and further wherein one of said current components comprises a torque-producing current component, the value of said torque-producing component during said fault condition being limited to values not exceeding a positive limit.

9. The control method of claim 8 wherein positive values of said torque-producing current component are used to set a direct current bus coupled to the inverter to a commanded value.

10. The control system of claim 8 wherein another of said current components comprises a flux-producing current component and wherein the value of said flux-producing component during said fault condition is based on rotor speed of the machine.

11. The control system of claim 8 wherein the value of said flux-producing component during said fault condition is further based on the voltage level of a direct current bus coupled to the inverter.

12. The control system of claim 8 further comprising a switching unit responsive to a switching control signal to switch between respective distinct sources of the current components, one of said sources used during a normal condition and another of said sources used during the fault condition.

13. The control system of claim 12 wherein said processor comprises the source used during the fault condition and includes a look-up table configured to store values of said flux-producing current component as a function of rotor speed.

14. The control system of claim 13 wherein said stored values are further based on a sensed voltage level of a direct current bus coupled to the inverter.

15. The control system of claim 14 wherein said processor further includes a controller responsive to a difference output signal indicative of the difference between a reference bus voltage value and the sensed bus voltage value, and a limiter coupled to said controller to supply the torque-producing current component.

16. A control system for controlling an inverter-driven permanent magnet machine, the system comprising:

a monitor coupled to receive a signal indicative of a fault condition; and a processor coupled to supply during the fault condition a respective signal configured to maintain a field weakening current during said fault condition wherein the signal from said processor comprises a torque command signal and wherein the level of said torque command signal during said fault condition is limited to values not exceeding a positive limit.

17. The control system of claim 16 further comprising a switching module responsive to a switching control signal to switch between distinct sources of the torque command signal, one of said sources used during a normal condition and another of said sources used during the fault condition.

18. The control system of claim 17 wherein said processor comprises the source used during the fault condition, and said processor includes a controller responsive to a difference output signal indicative of the difference between a reference bus voltage value and a sensed bus voltage value, and a limiter coupled to said controller to supply the torque command signal.

* * * * *